US011433595B2

(12) United States Patent
Wolf et al.

(10) Patent No.: US 11,433,595 B2
(45) Date of Patent: Sep. 6, 2022

(54) DEVICE FOR FORMFREE PRINTING A THREE-DIMENSIONAL OBJECT IN LAYERS

(71) Applicants: Dow Silicones Corporation, Midland, MI (US); innovatiQ GmbH + KG, Feldkirchen (DE)

(72) Inventors: Hans Peter Wolf, Liederbach (DE); Michael Backer, Mainz (DE); Stephan Baumann, Rhens (DE); Florian Bautz, Forstern (DE)

(73) Assignees: Dow Silicones Corporation, Midland, MI (US); innovatiQ GmbH + KG, Feldkirchen (DE)

( * ) Notice: Subject to any disclaimer, the term of this patent is extended or adjusted under 35 U.S.C. 154(b) by 232 days.

(21) Appl. No.: 16/349,099

(22) PCT Filed: Nov. 10, 2017

(86) PCT No.: PCT/EP2017/078895
§ 371 (c)(1),
(2) Date: May 10, 2019

(87) PCT Pub. No.: WO2018/087293
PCT Pub. Date: May 17, 2018

(65) Prior Publication Data
US 2019/0270240 A1  Sep. 5, 2019

(30) Foreign Application Priority Data
Nov. 11, 2016 (EP) .................................. 16198523

(51) Int. Cl.
*B29C 64/295* (2017.01)
*B29C 64/106* (2017.01)
(Continued)

(52) U.S. Cl.
CPC .......... *B29C 64/106* (2017.08); *B29C 64/209* (2017.08); *B29C 64/264* (2017.08);
(Continued)

(58) Field of Classification Search
CPC ... B29C 64/106; B29C 64/264; B29C 64/295; B29C 64/209; B33Y 10/00; B33Y 30/00
See application file for complete search history.

(56) References Cited

U.S. PATENT DOCUMENTS 5,679,727 A   10/1997  Griffith et al.
8,828,763 B1   9/2014  Lee et al.
(Continued)

FOREIGN PATENT DOCUMENTS

CN        106163772 A       11/2016
DE    10-2014-222685 A1     5/2016
(Continued)

OTHER PUBLICATIONS

International Search Report and Written Opinion for Application No. PCT/EP2017078895 dated Jul. 16, 2018, 19 pages.
(Continued)

*Primary Examiner* — Joseph S Del Sole
*Assistant Examiner* — Jamel M Nelson
(74) *Attorney, Agent, or Firm* — Alston & Bird LLP

(57) ABSTRACT

According to various embodiments, a device for formfree printing a three-dimensional object in layers using at least one printing material includes: at least one printing head to output printing material in at least one printing material string; a printing platen to receive the at least one printing material string output by the at least one printing head; a rod-shaped heating device movably arranged over the printing platen; a heat controller configured to control the rod-shaped heating device to emit a heat irradiation directed to the printing platen to heat the at least one printing material
(Continued)

string; at least one motor coupled to the rod-shaped heating device to move it over the printing platen; a motor controller configured to control the at least one motor to move the rod-shaped heating device over the printing platen to harden the at least one printing material string printed on the printing platen.

11 Claims, 10 Drawing Sheets

(51) Int. Cl.
*B29C 64/264* (2017.01)
*B29C 64/209* (2017.01)
*C08L 83/04* (2006.01)
*B33Y 10/00* (2015.01)
*B33Y 30/00* (2015.01)
*C08G 77/20* (2006.01)
*C08G 77/12* (2006.01)

(52) U.S. Cl.
CPC ............ *B29C 64/295* (2017.08); *C08L 83/04* (2013.01); *B33Y 10/00* (2014.12); *B33Y 30/00* (2014.12); *C08G 77/12* (2013.01); *C08G 77/20* (2013.01)

(56) References Cited

U.S. PATENT DOCUMENTS

| | | | |
|---|---|---|---|
| 2007/0256595 A1 | 11/2007 | Nozoe | |
| 2014/0314613 A1 | 10/2014 | Hopkinson et al. | |
| 2015/0004274 A1 | 1/2015 | Ono | |
| 2015/0015171 A1 | 1/2015 | Nishibata | |
| 2017/0312981 A1 | 11/2017 | Selbertinger et al. | |

FOREIGN PATENT DOCUMENTS

| | | | | |
|---|---|---|---|---|
| DE | 102014222685 A1 | * | 5/2016 | ........... B29C 64/112 |
| EP | 0 999 036 A1 | | 5/2000 | |
| EP | 0999036 A1 | * | 5/2000 | ........... B29C 64/165 |
| WO | WO 2015/059502 A1 | | 4/2015 | |
| WO | WO 2015/073992 A1 | | 5/2015 | |
| WO | WO-2015073992 A1 | * | 5/2015 | ........... B29C 64/106 |
| WO | WO 2015/107333 A1 | | 7/2015 | |
| WO | WO 2015/193819 A2 | | 12/2015 | |
| WO | WO 2016/007672 A1 | | 1/2016 | |
| WO | WO 2016/044547 A1 | | 3/2016 | |
| WO | WO 2016/071241 A1 | | 5/2016 | |
| WO | WO-2016/119898 A1 | | 8/2016 | |
| WO | WO 2016/119898 A1 | | 8/2016 | |
| WO | WO 2016/148332 A1 | | 9/2016 | |
| WO | WO 2017/040874 A1 | | 3/2017 | |
| WO | WO 2017/044735 A1 | | 3/2017 | |

OTHER PUBLICATIONS

Noll, W., *Chemistry and Technology of Silicones*, Chapter 1 (1962) 1-9.
Extended European Search Report for European Application No. 16198523.9 dated Jul. 6, 2017, 7 pages.
Office Action for Korean Application No. 10-2019-7016772 dated Jul. 31, 2020, 16 pages.
Office Action for China Application No. 2017800700602 dated Sep. 30, 2020 (7 pages).
Search Report for China Application No. 2017800700602 dated Sep. 21, 2020 (3 pages).
Office Action for European Application No. 17801404.9 dated Sep. 21, 2021 (9 pages).

* cited by examiner

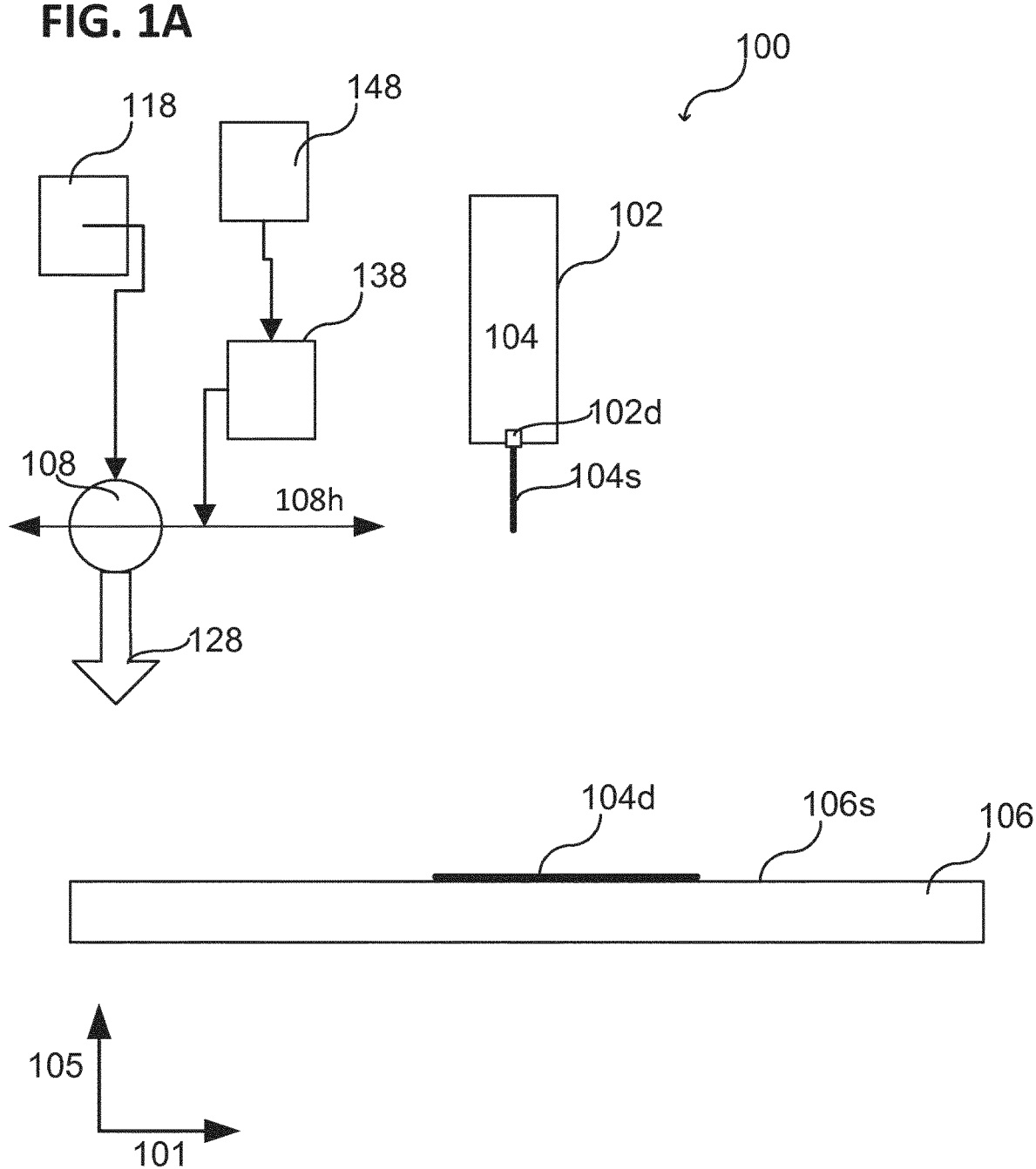

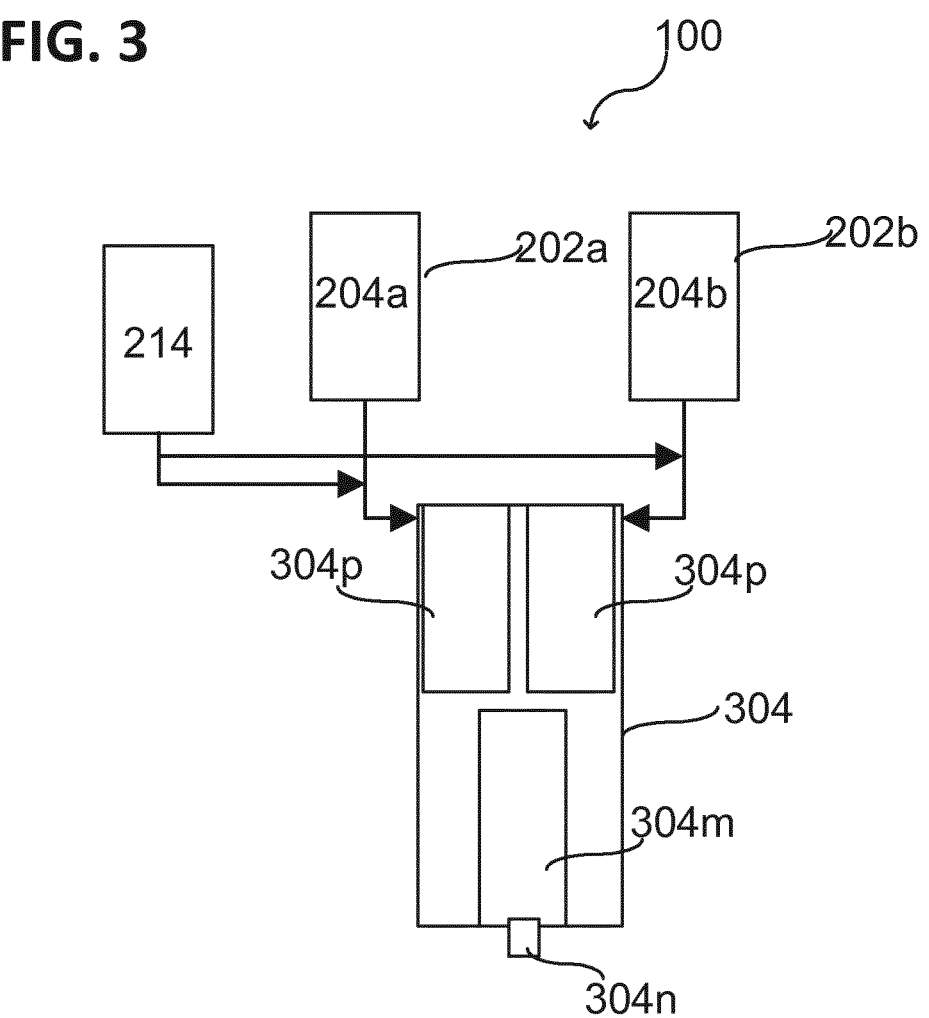

DEVICE FOR FORMFREE PRINTING A THREE-DIMENSIONAL OBJECT IN LAYERS

CROSS-REFERENCE TO RELATED APPLICATIONS

The present application is a national phase entry of PCT/EP2017/078895, filed on Nov. 10, 2017, which claims the benefit of European Patent Application No. 16198523.9, filed on Nov. 11, 2016, the entire contents of which are incorporated herein by reference in their entirety for all purposes.

TECHNICAL FIELD

Various embodiments relate generally to a device for formfree printing a three-dimensional object in layers.

BACKGROUND

Additive manufacturing is a rapidly growing field including various types of different techniques to create a three-dimensional object layer-by-layer under computer control. Additive manufacturing may be also referred to as three-dimensional printing (3D-printing) in a very broad sense. The nomenclature of additive manufacturing techniques is not necessarily uniformly chosen, however, there may be different main concepts in this field, as for example, binder jetting, directed energy deposition, material extrusion, material jetting, powder bed fusion, sheet lamination and vat photo polymerization. The different additive manufacturing techniques may vary in the way the desired three-dimensional shape of the object is generated, e.g. the way the successive layers are provided, in combination with a suitable material for this method. Extrusion type additive manufacturing techniques may include for example fused deposition modeling (FDM) or fused filament fabrication (FFF) and robocasting or direct ink writing. Powder bed type additive manufacturing techniques may include for example binder jetting (also referred to as powder bed and inkjet head 3D printing, 3DP), electron-beam melting (EBM), selective laser melting (SLM), selective heat sintering (SHS), selective laser sintering (SLS), and direct metal laser sintering (DMLS). Light polymerized type additive manufacturing techniques may include for example stereolithography (SLA) and digital light processing (DLP). Further, there may be various other types of additive manufacturing techniques.

SUMMARY

According to various embodiments, a device for formfree printing a three-dimensional object in layers using at least one printing material may include at least one printing head to output printing material in at least one printing material string, a printing platen to receive the at least one printing material string output by the at least one printing head, a rod-shaped heating device movably arranged over the printing platen, a heat controller configured to control the rod-shaped heating device to emit a heat irradiation directed to the printing platen to heat the at least one printing material string, at least one motor coupled to the rod-shaped heating device to move it over the printing platen, and a motor controller configured to control the at least one motor to move the rod-shaped heating device over the printing platen to harden the at least one printing material string printed on the printing platen.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 1A and FIG. 1B respectively show a device for formfree printing a three-dimensional object in layers in a schematic view, according to various embodiments;

FIG. 3 shows a device for formfree printing a three-dimensional object in layers in a schematic view, according to various embodiments.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

Various embodiments relate to an additive manufacturing process and to a device for creating a three-dimensional object via this additive manufacturing process, also referred to herein as printing device. According to various embodiments, the additive manufacturing process may base on a printing technique for successively forming the layers of the three-dimensional object. Therefore, a printing head is used to deposit the printing material for the respective layer.

In general, various printing materials may be used for additive manufacturing based on successively forming layers by printing, e.g. thermoplastic materials, pastes, duroplastic materials, low melting point metals, and the like. Thermoplastic materials may include, for example, polyamide (e.g. aliphatic polyamide), polyethylene, acrylonitrile butadiene styrene (ABS), a polyester, e.g. polycaprolactone (PCL), polycarbonate, Polylactic Acid (PLA), Polypropylene (PP), and/or mixtures thereof, etc. A substance used as printing material may be a paste or a liquid or any other material suitable for printing. A paste may behave as a solid until a sufficiently large load or stress is applied, at which point it flows like a fluid. Further, the temperature of the printing material may be adapted, e.g., via heating the printing material in the printing head, to change the viscosity of the printing material to allow printing or to optimize the printing result using the heated printing material.

However, it is to be noted that various embodiments may process other suitable printing materials as described above or as will be described in more detail below.

According to various embodiments, a printing material may be used including only one polymer or a blend of more than one polymer. The printing material may be configured that a polymerization may be triggered after the printing material has been printed. For example, a resin blend may be used as printing material, wherein the polymerization of the resin blend may be triggered by electromagnetic radiation and/or by heat (thermosetting polymer resin blends). To allow a triggered polymerization catalysts and/or initiators may be used.

Figure 1B:
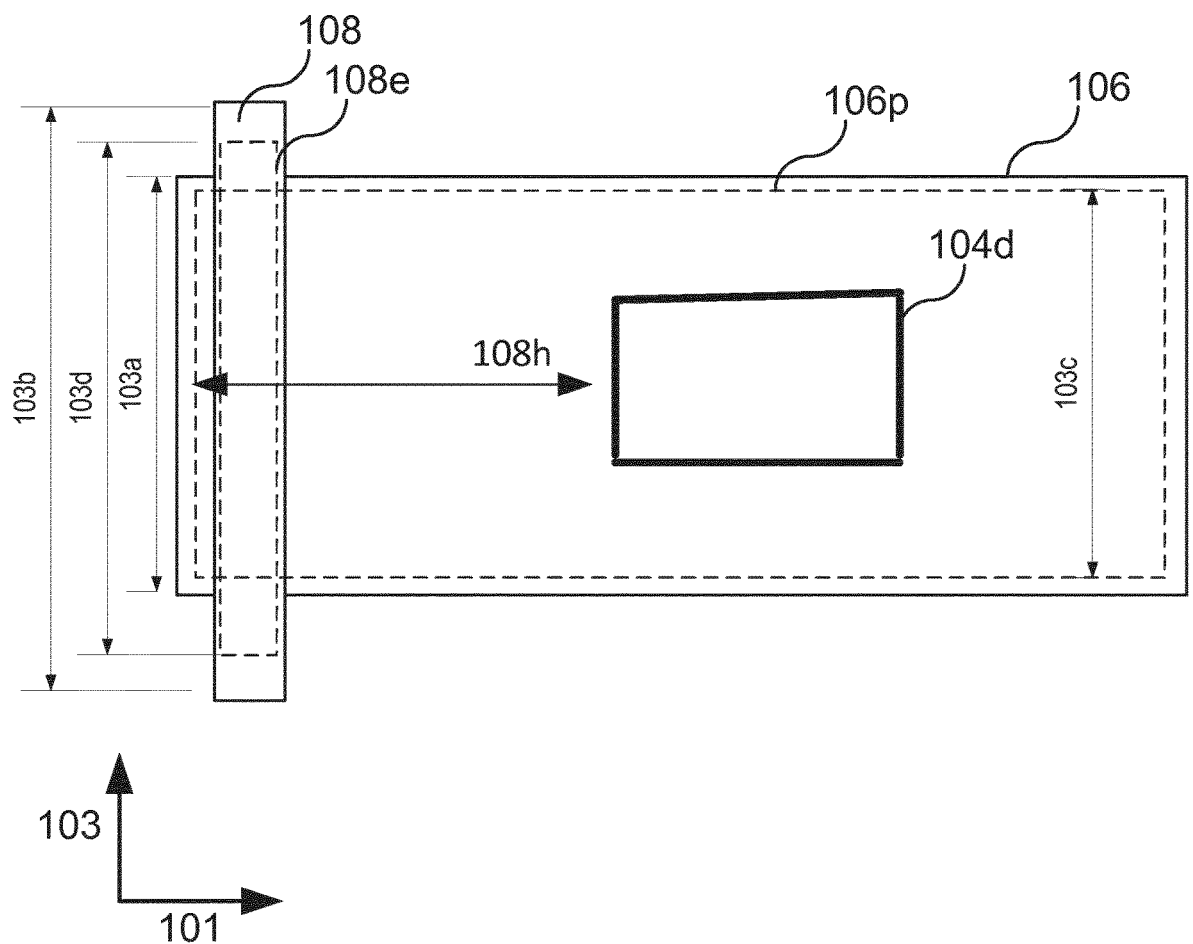

FIG. 1A illustrates a device 100 for formfree printing a three-dimensional object in layers in a schematic view, according to various embodiments. FIG. 1B illustrates the device 100 for formfree printing a three-dimensional object in layers in a schematic top view, according to various embodiments. As illustrated in FIG. 1A, the device 100 may include at least one printing head 102. The printing head 102 may be configured to output printing material 104 in at least one printing material string 104*s*. Therefore, the printing head 102 may include a nozzle 102*d* or the like to output the printing material 104 in string-shape.

According to various embodiments, the device 100 may further include a printing platen 106. The printing platen 106 may be configured to receive the at least one printing material string 104*s* output by the at least one printing head 102. The printing platen 106 may be arranged below the printing head 102, or, in other words, the printing head 102 may be arranged relative to the printing platen 106 so that the material string 104*s* can be deposited on the printing platen 106 as desired. The printing platen 106 may be coupled to an adjustment mechanism (not illustrated) that allows adjusting the position and/or the orientation of the printing platen 106 relative to the printing head 102. Further, e.g., optionally, the printing head 102 may be coupled to an adjustment mechanism (not illustrated) that allows adjusting the position and/or orientation of the printing head 102 relative to the printing platen 106. Further, the printing head 102 may be coupled to a drive mechanism (not illustrated) that allows moving the printing head 102 relative to the printing platen 106 in any desired way, e.g., the drive mechanism may be configured to allow driving the printing head 102 along an x-axis, y-axis, and/or z-axis. Further, e.g., optionally, the drive mechanism may be configured to allow tilting the printing head 102 around the x-axis, y-axis, and/or z-axis.

According to various embodiments, the device 100 may further include a rod-shaped heating device 108. The rod-shaped heating device 108 may be movably arranged 108*h* over the printing platen 106. According to various embodiments, the rod-shaped heating device 108 may be coupled to an adjustment mechanism (not illustrated) that allows adjusting the position and/or orientation of the rod-shaped heating device 108 relative to the printing platen 106. According to various embodiments, the rod-shaped heating device 108 may be movably arranged via at least one guide system or rail system defining a movement plane or a movement direction of the rod-shaped heating device 108 relative to the printing platen 106. According to various embodiments, one or more motors 138 may be used for moving 108*h* the rod-shaped heating device 108 relative to the printing platen 106. In other words, the device 100 may further include at least one motor 138 coupled to the rod-shaped heating device 108 to move the rod-shaped heating device 108 over the printing platen 106. The rod-shaped heating device 108 may be movably arranged 108*h* in such a way, that the rod-shaped heating device 108 can be moved in a direction (e.g., direction 101 illustrated in FIGS. 1A and 1B) or on a plane (e.g., the plane defined by the directions 101, 103 illustrated in FIGS. 1A and 1B) parallel to the surface 106*s* of the printing platen 106. The device 100 may further include a motor controller 148. The motor controller 148 may be configured to control the at least one motor 138 to move the rod-shaped heating device 108 over the printing platen 106. This may allow hardening the at least one printing material string 104*d* output by the printing head 102 (also referred to as printed) on the printing platen 106. The hardening may be used to solidify the printing material 104 deposited on the printing platen 106, since the printing material 104 may be liquid or viscous to allow printing via the printing head 102.

According to various embodiments, the device 100 may further include a heat controller 118. The heat controller 118 may be configured to control the rod-shaped heating device 108 to emit a heat radiation 128 directed to the printing platen 106 to heat the at least one printing material string 104*d* deposited onto the printing platen 106.

Illustratively, the rod-shaped heating device 108 may be coupled to a drive mechanism 138, 148 that allows moving the rod-shaped heating device 108 relative to the printing platen 106 in any desired way, e.g., the drive mechanism may be configured to allow driving the printing head 102 along an x-axis, y-axis, and/or z-axis. Further the drive mechanism 138, 148 may be configured to allow tilting the rod-shaped heating device 108 around the x-axis, y-axis, and/or z-axis. The tilting of the rod-shaped heating device 108 may be used to align the rod-shaped heating device 108 relative to the printing platen 106 to provide a homogeneous irradiation of the printing platen 106 or of the printing material string 104*d* output by the printing head 102 onto the printing platen 106. Further, a pre-defined distance (e.g., along direction 105 illustrated in FIG. 1A) between the rod-shaped heating device 108 and the printing platen 106 may be provided to generate a desired irradiation of the printing platen 106 or of the printing material string 104*d* output by the printing head 102 onto the printing platen 106. After alignment, the rod-shaped heating device 108 may be moved only along one direction (e.g., direction 101 illustrated in FIGS. 1A and 1B) parallel to the surface 106*s* of the printing platen 106 or in a plane (e.g., the plane defined by the directions 101, 103 illustrated in FIGS. 1A and 1B) parallel to the surface 106*s* of the printing platen 106.

The device 100 for formfree printing a three-dimensional object in layers may be used to successively deposit (also referred to as successively print) printing material 104*s* in layers 104*d* onto the printing platen 106 to provide the three-dimensional object in the desired size and shape. The printing of the layers may be computer assisted, as commonly used for additive manufacturing and three-dimensional printing.

According to various embodiments, the rod-shaped heating device 108 may include a rod-shaped lamp, e.g., a UV-lamp for emitting ultra-violet (UV) radiation (also referred to UV light) or an IR-lamp for emitting infrared (IR) radiation (also referred to IR light). Therefore, the rod-shaped lamp may be configured to emit light having a wavelength in the range from about 100 nm to about 380 nm. Alternatively, the rod-shaped lamp may be configured to emit light having a wavelength in the range from about 780 nm to about 1 mm.

According to various embodiments, the rod-shaped heating device 108 (e.g., the rod-shaped lamp) may have a length 103*b* of approximately the same or greater than the width 103*a* of the printing platen 106 so that the radiated heat 128 is irradiated on substantially the entire width 103*a* of the printing platen 106. In other words, the rod-shaped heating device 108 may be configured to irradiate the entire surface 106*s* of the printing platen 106 by linearly moving 108*h* the rod-shaped heating device 108 over the printing platen 106, wherein the rod-shaped heating device 108 may be configured so that the axial extension (e.g., the extension along direction 103 as illustrated in FIG. 1B) of the rod-shaped heating device 108 is aligned at any angle excluding a parallel arrangement (e.g., perpendicular or at an angle between 45° and 90°) to the moving direction 108h (e.g., along direction 101 as illustrated in FIG. 1B).

As illustrated in FIG. 1B, the printing platen 106 may have an effective printing area 106p that may be smaller than the size of the printing platen 106, e.g., an effective printing width 103c that is less than the width 103a of the printing platen 106. Further, the rod-shaped heating device 108 may have an effective heating length 103d (i.e. the axial extension) that may be less than the length 103b of the rod-shaped heating device 108. The effective heating length 103d may be defined by the actual region of the rod-shaped heating device 108 homogeneously emitting heat. For example, a heating lamp of the rod-shaped heating device 108 may be shorter than the rod-shaped heating device 108 itself including for example additional structures (e.g., lamp sockets, etc.). In this case, the effective heating length 103d of the rod-shaped heating device 108 (e.g., the rod-shaped lamp) may be the same or greater than the effective printing width 103c of the printing platen 106 so that the heat 128 radiated by the rod-shaped heating device 108 is irradiated on substantially the entire effective printing area 106p of the printing platen 106. In other words, the rod-shaped heating device 108 may be configured to irradiate the effective printing area 106p of the printing platen 106 by linearly moving 108h the rod-shaped heating device 108 over the printing platen 106, as described before.

According to various embodiments, the rod-shaped heating device 108 (e.g., the rod-shaped lamp, etc.) may have a length in the range from about 10 cm to about 2 m, e.g., in the range from about 10 cm to about 1 m. According to various embodiments, the printing platen 106 may have a width less than about the length of the rod-shaped heating device 108.

According to various embodiments, the motor controller 148 may be further configured to control the at least one motor 138 to move the rod-shaped heating device 108 over the printing platen 106 at least once each time after a respective layer of the at least one printing material string 104d has been printed on the printing platen 106. Illustratively, after printing and before printing the next layer, each printed layer of the successively printed layers may be irradiated by moving the rod-shaped heating device 108 over the printing platen 106 at least once, e.g., twice.

According to various embodiments, the heat controller 118 may be further configured to control the rod-shaped heating device 108 to emit a heat irradiation 128 directed to the printing platen 106 to heat the at least one printing material string 104d to a reaction temperature of the at least one printing material of the at least one printing material string 104d. Illustratively, a reactive printing material may be used to successively print the layers forming the desired three-dimensional object, wherein the chemical reaction of the printing material may be triggered by subjecting the printing material to radiation 128 (e.g. heat radiation, also referred to IR-light) emitted by the rod-shaped heating device 108. According to various embodiments, the printing material may be a thermosetting material, e.g., a thermosetting polymer material or a thermosetting polymer material blend, wherein the chemical reaction may be a polymerization of the thermosetting material.

Figure 2A:
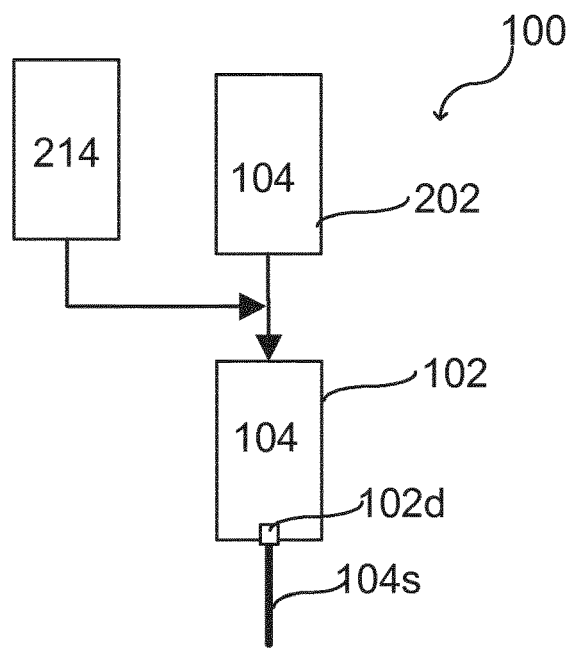
FIGS. 2A and 2B respectively show a device for formfree printing a three-dimensional object in layers in a schematic view, according to various embodiments.
Figure 2B:
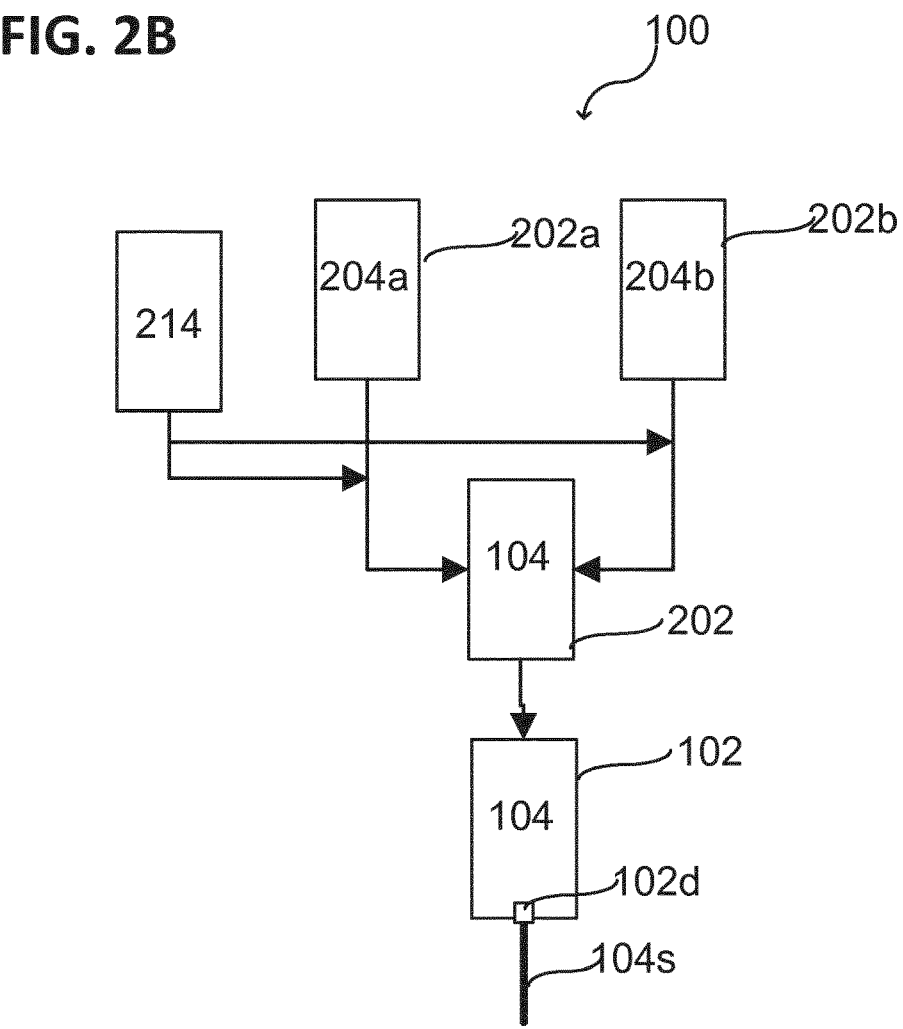

According to various embodiments, the device 100 may further include a reservoir 202 to receive the at least one printing material 104, as respectively illustrated in FIG. 2A and FIG. 2B in a schematic view. According to various embodiments, the reservoir 202 may be coupled to the at least one printing head 102 to supply the at least one printing material 104 to the at least one printing head 102. The reservoir 202 may be part of the printing head 102 or may be provided separated from the printing head 102 feeding the printing material to the printing head 102 via one or more feeding lines.

As illustrated in FIG. 2B, the device 100 may further include a first pre-reservoir 202a to receive a first pre-printing liquid 204a and a second pre-reservoir 202b to receive a second pre-printing liquid 204b. The pre-reservoir 202a, 202b may be configured to provide the first pre-printing liquid 204a and the second pre-printing liquid 204b to the reservoir 202. The reservoir 202 may be configured to provide the at least one printing material 104 from the first pre-printing liquid 204a and the second pre-printing liquid 204b. Illustratively, the first pre-printing liquid 204a and the second pre-printing liquid 204b are mixed to thereby obtain the at least one printing material 104. The reservoir 202 and the pre-reservoir 202a, 202b may be part of the printing head 102 or may be provided separated from the printing head 102 feeding the printing material to the printing head 102 via two or more feeding lines.

According to various embodiments, the first pre-printing liquid 204a and the second pre-printing liquid 204b may be components of a thermosetting printing material 104 or any other reactive printing material 104, where the chemical reaction may be triggered by the rod-shaped heating device 108. In the same way, a rod-shaped radiation emitting device 108 may be used, wherein the first pre-printing liquid 204a and the second pre-printing liquid 204b may be components of a chemically reactive printing material 104, where the chemical reaction may be triggered by the rod-shaped radiation emitting device 108.

According to various embodiments, a dosage controller 214 may be used to dose (e.g., via a dosing unit controlled by the dosage controller 214) the at least one printing material 104 supplied to the reservoir 202, as schematically illustrated in FIG. 2A and FIG. 2B. According to various embodiments, the dosage controller 214 may be configured to dose (e.g., via a dosing unit controlled by the dosage controller 214) the amount of the first pre-printing liquid 204a and the amount of the second pre-printing liquid 204b supplied to the reservoir 202, as schematically illustrated in FIG. 2B. The pre-printing liquids 204a, 204b may be also referred to as components of the printing material 104.

According to various embodiments, a device for mold-free (in other words formfree) printing (also referred to das additive manufacturing or 3D-printing) a three-dimensional object via successively formed layers using at least one printing material may be provided in a similar way as described above referring to FIGS. 1A to 2B. The device for mold-free printing a three-dimensional object via successively formed layers using at least one printing material may include: a printing platen 106; at least one printing head 102 configured to output 104s (in other words to print, e.g. to extrude or to string-shaped extrude) the at least one printing material 104 and to form at least one printing material deposit 104d on the printing platen (via the at least one printing material output 104s by the at least one printing head 102); and a rod-shaped heating device 108 arranged over the printing platen 106 in a moveable configuration 108h allowing movement of the rod-shaped heating device 108 over the printing platen 106, wherein the rod-shaped heating device 108 may be configured to emit heat radiation 128 directed at the printing platen 106 to harden the at least one printing material deposit 104d via the heat radiation.

The at least one printing head 102 may be optionally configured to output the at least one printing material 104 in a string-shape 104s, as described above.

The device may further include a motor arrangement 138, 148 configured to drive movement of the rod-shaped heating device 108. According to various embodiments, the motor arrangement 138, 148 may include at least one motor 138 coupled to the rod-shaped heating device 108 and at least one motor controller 148 configured to control the driven movement of the rod-shaped heating device 108 via the at least one motor 138. The device may further include a heating device controller 118 configured to control emission of the heat radiation 128 from the rod-shaped heating device 108.

A dosage controller 214 may include a control circuit and at least one dosing unit controlled by the control circuit. The dosage controller 214 may be part of a dispensing system, the at least one dosing unit may be also referred to as dispenser. According to various embodiments, the dispensing system used to dispense the printing material 104 and/or the pre-printing liquids 204a, 204b (see FIGS. 2A and 2B) may include one dispenser or more than one dispenser. The dispenser may include at least one valve. Alternatively, valve-free dispenser may be used, e.g., a dispenser based one a rotatable mounted scroll structure disposed within a hollow tube. According to various embodiments, the dosage controller 214 may be configured to provide a suck-back process at the end of each dosing step, e.g., by changing the rotation direction of the rotatable mounted scroll structure. The, e.g., valve-free, dispenser may be also referred to as a pump.

The dispenser may provide the printing material 104 for the printing head 102 and the dosage controller 214 may be used to control the flow of the printing material 104 out of the printing head 102. In other words, the output of the printing material 104 may be controlled by the dosage controller 214. According to various embodiments, the dosage controller 214 may be part of the printing head 102 or may be arranged separated from the printing head 102.

In the case, that a two-component 204a, 204b printing material 104 is used (or in a similar way a printing material based on more than two components), each of the components 204a, 204b may be extracted from their pre-reservoir 202a, 202b (e.g., from any suitable container) and mixed in a predefined ratio to provide the printing material in the reservoir 202 (see FIG. 2B).

Further, a single-component printing material 104 may be provided to the reservoir 202 from any suitable container directly (see. FIG. 2A). However, also a two-component printing material may be mixed in advance and provided as pre-mixed printing material directly to the printing head 102.

To extract a pre-printing liquid 204a, 204b and/or a printing material 104 from a reservoir, any suitable emptying system may be used. According to various embodiments, any suitable printing device may be used that is based on a X,Y,Z-axis setup. According to various embodiments, the printing head 102 may be configured as dispenser or dispenser system for dosing single-component or two-component (or multi-component) printing materials. The dispenser or dispenser system for two-component 204a, 204b (or multi-component) printing materials 104 may include a mixer two provide a homogeneously mixed printing material 104. The mixer may be arranged to receive the components 204a, 204b in the predefined ratio to provide the printing materials 104 with the desired composition. The mixer may be a static mixer and the mixing ratio may be controlled by the dosage controller 214.

According to various embodiments, the rod-shaped heating device 108 may include one or more short-wave infrared tube radiator (e.g., short-wave infrared tube radiator from the manufacturer HEWID® Heizelemente GmbH). The short-wave infrared tube radiator may emit substantially radiation in the wavelength range from about 780 nm to about 3500 nm. However, one or more other suitable infrared radiator may be used, e.g., one or more ceramic radiator that emit heat by converting electrical energy, and the like. The IR-tube radiator may be mounted along the Y-axis of the printer, for example. The emission of the rod-shaped heating device 108 may be controlled by a heating current provided through at least one heating element of the rod-shaped heating device 108. The heating element may be or may include a heat resistor structure. According to various embodiments, the rod-shaped heating device may include a reflector structure configured to emit radiation substantially into the direction of the printing platen 106.

According to various embodiments, a dispenser (e.g., from the manufacturer ViscoTec) may be used as a printing head in a three-dimensional printer (also referred to herein as printing device), e.g., in an X400 printer of the manufacturer German RepRap. The printing material 104 or the pre-printing liquids 204a, 204b may be stored in one or more containers, e.g., spatially separated from the three-dimensional printer itself. The printing material 104 or the pre-printing liquids 204a, 204b may be fed from the one or more containers to the dispenser via a pump arrangement (also referred to as emptying system). For feeding the printing material 104 or the pre-printing liquids 204a, 204b to the dispenser, one or more supply lines (e.g., one or more hoses, e.g., one or more tubes) may be used. According to various embodiments, one separate supply line for each of the components of the printing material 104 may be provided.

According to various embodiments, the control system of the printing device (e.g., device 100) described herein may be configured to provide a direct communication controlling the dispenser movement, the mixing of the pre-printing liquids 204a, 204b (if necessary) and the infrared tube radiator, e.g., including the temperature control for the infrared tube radiator.

According to various embodiments, FIG. 3 schematically illustrates a process flow for formfree printing a three-dimensional object in layers may include a material supply and a process of additive manufacturing the three-dimensional object in a desired shape, e.g., using a 2-component 204a, 204b printing material 104 and a suitably configured printing device 100, as described herein.

According to various embodiments, the two printing material components 204a, 204b (also referred to as pre-printing liquids) may be fed from the respective containers 202a, 202b (also referred to as pre-reservoir), e.g., unmixed, to the dispenser 304, e.g., via an emptying system. The dispenser 304 may be mounted in a printing device as a printing head 102 and may be addressed computer controlled in a similar way as a printing head 102, as described above. The dispenser 304 may include two separately controllable pumps 304p. For example, for each of the two printing material components 204a, 204b a separately controllable pump 304p may be used. The pumps 304p may feed the two printing material components 204a, 204b to a mixer 304m (e.g., to a static mixer) in a controlled manner. The mixer 304m may be arranged below the pumps 304p and may be part of the dispenser 304 or may be coupled to the dispenser 304. The mixer 304m may feed the mixed printing material 104 to a nozzle 304n to output the mixed printing material 104 through the nozzle 304n. The nozzle may have a pre-defined output diameter, e.g., adapted to the viscosity of the mixed printing material 104.

According to various embodiments, each of the printing material components 204a, 204b may be provided under a pressure in the range from about 1 bar to 3 bar, e.g., a pressure of about 2 bar, to the respective pump input of the pumps 304p. The pressure may be provided and controlled by the emptying system. The pumps 304p may be configured as rotation pumps including at least one scroll element for controlling the material output to the mixer 304m based on the rotational speed of the at least one scroll element. The pumps 304p may be configured to feed the printing material components 204a, 204b to the mixer 304m in a predefined mixing ratio. The mixing ratio may be adjusted to the predefined value by controlling the rotational speed of the at least one scroll element of the respective pump 304p (e.g., a greater rotational speed may allow to feed more material to the mixer as a less rotational speed).

As an example, to obtain a mixing ratio of 1:1 both pumps may be operated with the same number of rotations per minute (rpm), i.e. with the same rotational speed. As another example, to obtain a mixing ratio of 1:2 the material pump 304p for the second material component 204b may be operated with twice the number of rotations per minute (rpm) as the material pump 304p for the first material component 204a.

Both pump outputs may be coupled directly to the mixer 304m. In the mixer, the two material components 204a, 204b may be mixed with each other. The mixer 304m may be coupled directly to the nozzle 304n. Further, the mixed printing material 104 may be output by the nozzle 304n (see also FIG. 1A illustrating a similar configuration).

According to various embodiments, the process of additive manufacturing may include providing printing data (e.g., provided in gcode) for controlling the printing device 100, as descried herein. The printing data may be transmitted to a device controller of the printing device 100 and the device controller may further process the printing data. According to various embodiments, the dispenser 304 may be controlled by the device controller as a printing head, e.g., the dispenser 304 may be moved over the printing platen 106 as defined in the printing data to form a three-dimensional object in a desire size and shape. The device controller may further control the mixing of the material components 204a, 204b of the printing material 104. A communication interface (e.g., a communication interface circuit) may be provided to define the mixing ratio of the material components 204a, 204b. Alternatively, the device controller may be configured to communicate with a mixing controller, wherein the mixing controller may be configured to control a mixing ratio of the material components 204a, 204b of the printing material 104. A communication interface (e.g., a communication interface circuit) may be provided directly at the mixing controller to define the mixing ratio of the material components 204a, 204b. According to various embodiments, the mixing ratio may be adapted before and/or during the additive manufacturing process, i.e. before and/or during operating the printing device 100, as described herein.

According to various embodiments, the printing process may include moving the dispenser along a predefined path by controlling the X-axis and Y-axis movement of the dispenser. Further, the dispenser may output the mixed printing material 104 directly onto the printing platen 106. The printing platen 106 may include or may consist of a glass-ceramic. However, other materials may be used to provide the printing platen 106.

According to various embodiments, after printing of a layer has been finished, the dispenser 304 may be moved away from the printing object to provide space for the rod-shaped heating device 108 (e.g., for the infrared tube radiator or any other suitable radiation emitting device) to move over the printing platen 106. Subsequently, the rod-shaped heating device 108 may be activated and set to a material-specific reaction temperature to harden the printing material 104d (see FIGS. 1A and 1B). The rod-shaped heating device 108 may be moved with a fixed distance to the printing platen 106 and/or to the printed material layer 104d directly over the printed material layer 104d. According to various embodiments, the rod-shaped heating device 108 may be moved at least one time (e.g., two times) over the printed material layer 104d. According to various embodiments, the rod-shaped heating device 108 may be moved two times over the printed material layer 104d, once back and forth.

Subsequently, the z-axis distance of the dispenser to the printing platen 106 may be increased for printing the next layer of the successively printed layers to form the three-dimensional object in a desired shape and size.

According to various embodiments, the processes of printing a layer via the mixed printing material and hardening (also referred to as curing, activating, triggering, and the like) the mixed printing material of the printed layer may be repeated alternatingly.

After a few seconds, the mixed printing material may be stable. The generated object may be taken out of the device 100 (e.g., may be removed from the printing platen 106) after a few minutes.

According to various embodiments, the above process may be carried out using various types of printing materials. Such printing materials may include those reactive liquid materials, which may be injected in the printing device and cure/react upon heating to form a printed object or a (or multiple) printed layer(s) of an object. However, other suitable materials may be used in various embodiments.

Such materials include resins, some of which may be cured by UV light; silicone rubbers. Further materials include thermoplastics, such as acrylonitrile butadiene styrene (ABS), polycarbonate, nylon, polyetherimide (PEI) resin.

For the sake of examples, the present device is used featuring a 3D-printable silicone rubber composition.

3D-printable silicone rubber compositions typically cure or react to provide 3D-printed silicone rubber articles, also referred to as 3D-printed silicone elastomer articles or 3D-printed silicone rubbers. The terms silicone rubber and silicone elastomer may be used interchangeably. 3D-printable silicone rubber compositions include platinum cured silicone rubbers (addition reaction, otherwise known as hydrosilylation).

Various effects of 3D-printed silicone rubbers may include low scale application without need of reproducing molds, easy prototyping allowing to avoid injection molding, precision printing of small or unique pieces.

Organopolysiloxanes may generally be described as polymers having multiple units of the formula (I):

$$R_a SiO_{(4-a)/2} \tag{I}$$

in which R is independently selected from hydrogen, aliphatic hydrocarbyl, aromatic hydrocarbyl, or organyl group (that is any organic substituent group, regardless of functional type, having one free valence at a carbon atom). Saturated aliphatic hydrocarbyls are exemplified by, but not limited to alkyl groups such as methyl, ethyl, propyl, pentyl, octyl, undecyl, and octadecyl and cycloalkyl groups such as cyclohexyl. Unsaturated aliphatic hydrocarbyls are exemplified by, but not limited to, alkenyl groups such as vinyl, allyl, butenyl, pentenyl, cyclohexenyl and hexenyl; and by alkynyl groups. Aromatic hydrocarbon groups are exemplified by, but not limited to, phenyl, tolyl, xylyl, benzyl, styryl, and 2-phenylethyl. Organyl groups are exemplified by, but not limited to, halogenated alkyl groups such as chloromethyl, 3-chloropropyl, and 3,3,3-trifluoropropyl; nitrogen containing groups such as amino groups, amido groups, imino groups, imido groups; oxygen containing groups such as polyoxyalkylene groups, carbonyl groups, alkoxy groups and hydroxyl groups. Further organyl groups may include sulfur containing groups, fluor containing groups, phosphorus containing groups, boron containing groups. The subscript "a" is an integer of from 0 to 3.

Siloxy units may be described by a shorthand (abbreviated) nomenclature, namely—"M," "D," "T," and "Q", when R is a methyl group (further teaching on silicone nomenclature may be found in Walter Noll, *Chemistry and Technology of Silicones*, dated 1962, Chapter I, pages 1-9). The M unit corresponds to a siloxy unit where a=3, that is $R_3SiO_{1/2}$; the D unit corresponds to a siloxy unit where a=2, namely $R_2SiO_{2/2}$; the T unit corresponds to a siloxy unit where a=1, namely $R_1SiO_{3/2}$; the Q unit corresponds to a siloxy unit where a=0, namely $SiO_{4/2}$.

A typical 3D-printable silicone rubber composition may include:
an organopolysiloxane (A) containing at least 2 alkenyl groups bonded to silicon atom per molecule,
an organopolysiloxane (B) containing at least 3 silicon-bonded hydrogen atom per molecule,
a platinum based catalyst (C),
an optional inhibitor (D),
an optional silica filler (E).

The platinum based catalyst is added in an amount sufficient to effect and initiate the cure of the organopolysiloxanes (A) and (B). The inhibitor of the platinum based catalyst is optional. It is typically used to stabilize the composition before curing is effected, by inhibiting the cure catalyst. The silica filler may be present to reinforce the 3D-printed silicone elastomer and/or to influence the rheological properties of the 3D-printable composition in the uncured stage.

A typical molar ratio of inhibitor to the platinum atom of the catalyst usually ranges of from 20 to 100, that is, the molar ratio of inhibitor to the platinum atom is typically comprised of from 20:1 to 100:1.

The cure temperature of a typical 3D-printable silicone rubber composition may range of from 100 to 220° C., alternatively 120 to 190° C., alternatively 140 to 180° C. The present operating device may however function at temperatures of from 20° C. to 250° C.

The organopolysiloxane (A) may have any structure. The organopolysiloxane (A) may be a linear, branched or resinous polymer.

The organopolysiloxane (A) contains at least 2 alkenyl groups bonded to silicon atom per molecule. Examples of alkenyl groups include vinyl, allyl, butenyl, pentenyl, cyclohexenyl and hexenyl groups. These may be pendent or terminal or at both positions, that is, they may be present on any of the siloxy units of the organopolysiloxane (A).

The viscosity of organopolysiloxane (A) at 25° C. is typically within a range of from 0.1 to 100 Pa·s. Unless otherwise indicated, all viscosities are measured using a rotational viscometer such as a Brookfield viscometer, or by using a capillary rheometer.

The organopolysiloxane (A) may contain phenyl groups.
The organopolysiloxane (A) may contain fluorine containing groups such as trifluoropropyl groups.

Examples of the organopolysiloxane (A) which may be used include vinyldimethylsiloxy-endblocked dimethylsiloxane-vinylmethylsiloxane copolymer, vinyldimethylsiloxy-endblocked polydimethylsiloxane, vinylmethylhydroxysiloxy-endblocked dimethylsiloxane-vinylmethylsiloxane copolymer, vinyldimethylsiloxy-endblocked dimethylsiloxane-vinylmethylsiloxane copolymer, and mixtures thereof.

The organopolysiloxane (A) may be either a single polymer, or a combination of two or more different polymers.

The organopolysiloxane (A) is present in the formulation at a level of from 35 to 85% by weight, based on the total weight of the composition.

The organopolysiloxane (B) is an organopolysiloxane containing at least 3 silicon-bonded hydrogen atom per molecule conforming to the general formula (II):

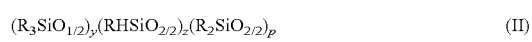

$(R_3SiO_{1/2})_y(RHSiO_{2/2})_z(R_2SiO_{2/2})_p$ (II)

where R is as described above (independently selected from hydrogen, aliphatic hydrocarbyl, aromatic hydrocarbyl, or organyl group), and H is hydrogen and
where y=2, z≤3, p>0.

The viscosity of organopolysiloxane (B) at 25° C. is not critical. The viscosity of organopolysiloxane (B) at 25° C. may range of from 0.1 to 1000 mPa·s, alternatively of from 1 to 500 mPa·s.

The organopolysiloxane (B) is generally present in the 3D-printable silicone elastomer composition in an amount of from 0.1 to 15% by weight, based on the total weight of the composition.

Addition-reaction catalysts are well known in the art. These include catalysts selected form the platinum group metals, or transition metals, of the periodic table of the elements, such as platinum, ruthenium, rhodium, palladium, osmium and iridium; and compounds thereof.

The catalyst used in the scope of the present invention may be selected from the platinum based catalysts, such as chloroplatinic acid, chloroplatinic acid dissolved in an alcohol or a ketone and these solutions which have been ripened, chloroplatinic acid-olefin complexes, chloroplatinic acid-alkenylsiloxane complexes, chloroplatinic acid-diketone complexes, platinum black, platinum supported on a carrier, and mixtures thereof.

The catalyst (C) is added in a quantity sufficient to cure the organopolysiloxane (A) and the organopolysiloxane (B) present in the composition. For example, it may be added in a quantity of platinum atom that provides of from 0.1 to 500 weight-ppm (parts per million), alternatively of from 1 to 200 weight-ppm, alternatively of from 1 to 100 weight-ppm, of platinum atom in the catalyst (C) based on the total weight of reactive organopolysiloxanes (A) and (B).

Inhibitors of platinum based catalyst are well known in the art. Addition-reaction inhibitors include hydrazines, triazoles, phosphines, mercaptans, organic nitrogen compounds, acetylenic alcohols, silylated acetylenic alcohols, maleates, fumarates, ethylenically or aromatically unsaturated amides, ethylenically unsaturated isocyanates, olefinic siloxanes, unsaturated hydrocarbon monoesters and diesters, conjugated eneynes, hydroperoxides, nitriles, and diaziridines.

Examples of acetylenic alcohols and their derivatives include 1-ethynyl-1-cyclohexanol (ETCH), 2-methyl-3-butyn-2-ol, 3-butyn-1-ol, 3-butyn-2-ol, propargylalcohol, 2-phenyl-2-propyn-1-ol, 3,5-dimethyl-1-hexyn-3-ol, 1-ethynylcyclopentanol, 1-phenyl-2-propynol, 3-methyl-1-penten-4-yn-3-ol, and mixtures thereof.

The inhibitor (D) may be added in the range of from 10 to 50,000 weight-ppm in the 3D-printable silicone elastomer composition.

The silica filler suitable for the present invention may have a specific surface area measured by BET method of at least 50 m$^2$/g up to 450 m$^2$/g. Examples of silica filler include precipitated silica (wet silica), fumed silica (dry silica), calcined silica, and the like. The silica filler may be surface-treated, hydrophilic or hydrophobic. The silica may contain alkenyl group on its surface.

In some instances, the silica contains alkenyl group on its surface. Methods to provide alkenyl groups on silica are known in the art.

The silica filler is present in the composition in an amount of from 10 to 40% by weight, based on the total weight of the composition.

Additives may be present in the composition depending on the intended use of the 3D-printable silicone elastomer composition. Examples of additives include electrical conductive fillers, thermally conductive fillers, non-conductive filler different from silica filler (E), pot life extenders, flame retardants, pigments, dyes, lubricants, adhesion promoters, fragrances, bleeding additives, mold release agents, diluents, solvents, UV light stabilizers, bactericides, wetting agent, heat stabilizer, compression set additive, plasticizer, etc.

Examples of electrical conductive fillers include metal particles, metal oxide particles, metal-coated metallic particles (such as silver plated nickel), metal coated non-metallic core particles (such as silver coated talc, or mica or quartz) and a combination thereof. Metal particles may be in the form of powder, flakes or filaments, and mixtures or derivatives thereof.

Examples of thermally conductive fillers include boron nitride, alumina, metal oxides (such as zinc oxide, magnesium oxide, aluminum oxide), graphite, diamond, and mixtures or derivatives thereof.

Examples of non-conductive fillers, different from silica filler (E), include quartz powder, diatomaceous earth, talc, clay, calcium carbonate, magnesium carbonate, hollow glass, glass fibre, hollow resin and plated powder, and mixtures or derivatives thereof.

Pot life extenders, such as triazole, may be used, but are not considered necessary in the scope of the present invention. The 3D-printable silicone elastomer composition may thus be free of pot life extender.

Examples of chain extender include straight chain organopolysiloxanes containing 2 silicon-bonded hydrogen groups on the terminal position. Such chain extender is different from organopolysiloxane (B).

Examples of flame retardants include aluminum trihydrate, chlorinated paraffins, hexabromocyclododecane, triphenyl phosphate, dimethyl methylphosphonate, tris(2,3-dibromopropyl) phosphate (brominated tris), and mixtures or derivatives thereof.

Examples of pigments include iron oxides, carbon black, and mixtures or derivatives thereof.

Examples of lubricants include tetrafluoroethylene, resin powder, graphite, fluorinated graphite, talc, boron nitride, fluorine oil, silicone oil, molybdenum disulfide, and mixtures or derivatives thereof.

Examples of adhesion promoters include silane coupling agents.

Examples of mold release agents include dimethylhydroxy terminated polydimethylsiloxane.

Examples of bleeding additives include phenyl substituted silicone oils of high viscosity.

Further additives include silicone fluids, such as trimethylsilyl or OH terminated siloxanes. Such trimethylsiloxy or OH terminated polydimethylsiloxanes typically have a viscosity <150 mPa·s. When present such silicone fluid may be present in the 3D-printable silicone elastomer composition in an amount ranging of from 0.1 to 5% weight, based on the total weight of the composition.

The 3D-printable silicone rubber composition may include:
- an organopolysiloxane (A) containing at least 2 alkenyl groups bonded to silicon atom per molecule, in an amount of from 35 to 85% by weight, based on the total weight of the composition;
- an organopolysiloxane (B) containing at least 3 silicon-bonded hydrogen atom per molecule, in an amount of from 0.1 to 15% by weight, based on the total weight of the composition;
- a platinum based catalyst (C), in a quantity of platinum atom that provides of from 0.1 to 500 weight-ppm (parts per million) of platinum atom in the catalyst (C) based on the total weight of reactive organopolysiloxanes (A) and (B);
- an inhibitor (D) selected from the group consisting of acetylenic alcohols and their derivatives, in an amount of from 10 to 50,000 weight-ppm in the 3D-printable elastomer composition;
- a silica filler (E), in an amount of from 10 to 40% by weight, based on the total weight of the composition;
- optional additives, in an amount of from 0 to 10% by weight based on the total weight of the composition, alternatively 0.1 to 10% by weight based on the total weight of the composition.

The 3D-printable silicone rubber may be prepared by:
firstly, forming a mixture of the 3D-printable silicone rubber composition, and secondly curing the mixture at a temperature of from 100 to 220° C.

The 3D-printable silicone rubber composition may readily be prepared in conventional mixing equipment. The order of mixing is not critical if the composition is to be used immediately.

The mixture of the 3D-printable silicone rubber composition may be prepared by providing for at least 2 separate parts, such as part I and part II. Part I may contain the catalyst (C) and any one of the organopolysiloxane (A) or the silica filler (E), or a combination of both. Part II may contain the inhibitor (D) and the organopolysiloxane (B), and any one of the organopolysiloxane (A) or the silica filler (E), or a combination of the latter two.

In some instances, the catalyst (C) is present in a separate part from the organopolysiloxane (B) and the inhibitor (D).

The other or optional additives may be in any of part I or II or in both parts. They may also be added after parts I and II have been combined.

The mixture may be prepared by providing for at least 3 separate parts, such as part I, part II and part III. Parts I and II may be provided as above. Part III may contain any of organopolysiloxane (A), organopolysiloxane (B), the catalyst (C), the inhibitor (D), the silica filler (E) or specific additives such as pigments, filler different from silica filler (E), which may be present as may be required by the final use of the composition.

Subsequently the different parts are combined together and homogeneously mixed, with the optional subsequent step of the addition of any additional additive as may be required by the final use of the composition.

Typically, the at least two parts are combined within the mixing device and injected to be printed. In some instances, the at least two parts may be combined prior to their injection in the printing device.

The dynamic viscosity of the final 3D-printable silicone elastomer composition may range of from 50 to 500 Pa·s, alternatively of from 50 to 300 Pa·s, alternatively of from 100 to 250 Pa·s as measured at room temperature, at a shear rate of 10 s$^{-1}$, using a plate-plate rheometer, according to standard method DIN53018.

The present 3D-printable silicone rubber composition may produce 3D-printed objects/articles having hardness (or durometer) in the range of 10-90 Shore A, alternatively 20-90 Shore A, alternatively 30-70 Shore A. Shore A durometer is typically measured using ASTM D2240-15. The terms hardness and durometer may be used interchangeably in the scope of the present invention.

The Shore A scale is most common for soft elastomeric materials, while the Shore D scale is used for harder materials such as plastics. A range of 80-90 Shore A typically corresponds to about 30-40 Shore D.

The present 3D-printed objects/articles obtained from printing/curing the 3D-printable silicone rubber composition include those that may be used in producing sports products, diving masks, ventilator bellows, balloon catheters, rubber teats, pacifiers, thin-walled membranes, switch covers, spark-plug connectors, medical products and devices, electrical insulators, single-wire seals, plug connector seals, tubing and valves, automobile components such as connector seal and spark plug boots, electric and electronic parts such as rolls in a copying machine and packing in a microwave oven; as well as other products such as feeding bottle nipple and diving gears, in view of the high heat resistance, cold resistance, safety, electric insulation, weatherability, and the like.

As an example, the 3D-printable composition includes:
- A1: vinyldimethylsiloxy-endblocked polydimethylsiloxane having a viscosity of approximately 53,000 mPa·s at 25° C.
- A2: vinyldimethylsiloxy-endblocked dimethylsiloxane-vinylmethylsiloxane copolymer having a viscosity of approximately 360 mPa·s at 25° C.
- B: Me$_3$SiO$_{0.5}$ terminal poly(dimethyl-co-methylhydrogen)siloxane having a viscosity of approximately 50 mPa·s at 25° C.
- C: divinyltetramethyldisiloxane complex of platinum
- D: 1-ethynyl-1-cyclohexanol
- E: fumed silica filler having a surface area of approximately 300 m$^2$ g; hydrophobized; having a vinyl functionalization of approximately 0.08 mmol/g
- Further additive: OH terminal PDMS with a viscosity of approximately 21 mPa·s at 25° C.

Said composition has a final viscosity of 120 to 200 Pa·s, before curing. The composition is provided in two parts and combined in the printing head, before the nozzle. Printed objects provided (i.e. readily processed articles) have a tensile strength of 5.71±0.23 MPa and an elongation at break of 332.60±12.19% when tested according to DIN53504-52; and a tear strength of 39.58±1.24 N/mm when tested according to ASTM D-624-B.

FIG. 4A to FIG. 4F illustrate a printing device 100 in various views, according to various embodiments, in a similar way, as described above.

According to various embodiments, the printing device 100 may include a housing structure 400 to mount the components of the printing device 100, e.g., to mount a printing platen 106, a movably arranged printing head 102, a movably arranged rod-shaped heating device 108, as well as controllers, motors, etc.

Figure 4A:
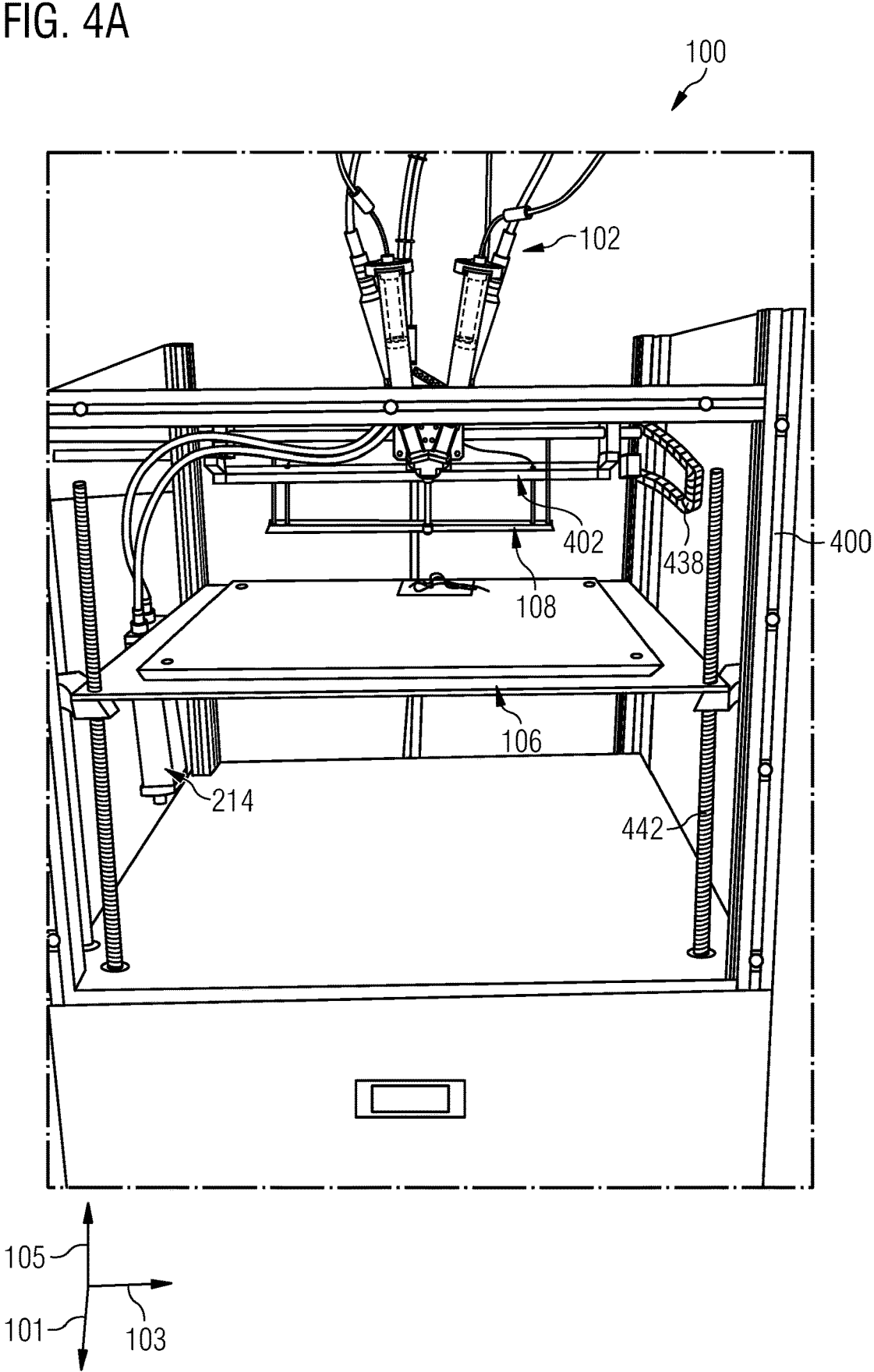
FIGS. 4A to 4F show a device for formfree printing a three-dimensional object in layers in a schematic view, according to various embodiments.

As illustrated for example in FIG. 4A, the printing platen 106 may be movably arranged, e.g., to move in z-direction. A plurality of threaded rods 442 may be used to move the printing platen 106 via rotating the threaded rods 442. The threaded rods 442 may be driven by one or more motors coupled to the threaded rods 442. These one or more motors may be driven by a motor control circuit, according to various embodiments.

According to various embodiments, a guiding structure 402 (e.g., a guiding frame) may be used to provide a movable arrangement including the rod-shaped heating device 108 and the printing head 102. The guiding structure 402 may be linearly movably arranged (e.g., to be moved along the x-direction), e.g., the guiding structure 402 may be movably mounted on one or more rails. In this case, the rod-shaped heating device 108 and the printing head 102 may be linearly moved at the same time (e.g., along the x-direction). A motor arrangement 438 may be used to move the guiding structure 402, i.e. to move the printing head 102 and the rod-shaped heating device 108. According to various embodiments, the movement of the guiding structure 402 may be driven by one or more motors coupled to the guiding structure 402, for example via a belt (e.g., via a toothed belt). These one or more motors may be driven by a motor control circuit, according to various embodiments.

According to various embodiments, the rod-shaped heating device 108 may be fixed at the guiding structure 402, e.g., via one or more carrier elements. One or more electrical supply lines may be coupled to the rod-shaped heating device 108 to generate heat radiation, wherein the one or more electrical supply lines may be attached to the guiding structure 402. The rod-shaped heating device 108 may be aligned in parallel to the printing platen 106 in a fixed distance. According to various embodiments, the printing head 102 may be movably mounted at the guiding structure 402. The printing head 102 may be linearly movably arranged (e.g., to be moved along the y-direction). According to various embodiments, the movement of the printing head 102 may be driven by one or more motors coupled to the printing head 102. The movement of these one or more motors may be controlled by a motor control circuit, according to various embodiments. The motors for moving the printing platen 106, the guiding structure 402 together with the printing head 102 and the rod-shaped heating device 108 and for moving the printing head 102 relative to the guiding structure 402 may allow printing three-dimensional objects on the printing platen 106. The motor control circuits for controlling the X,Y,Z-movement may be part of at least one motor controller 148.

Further, a dosage controller 214 may be mounted at the housing structure 400.

Figure 4B:
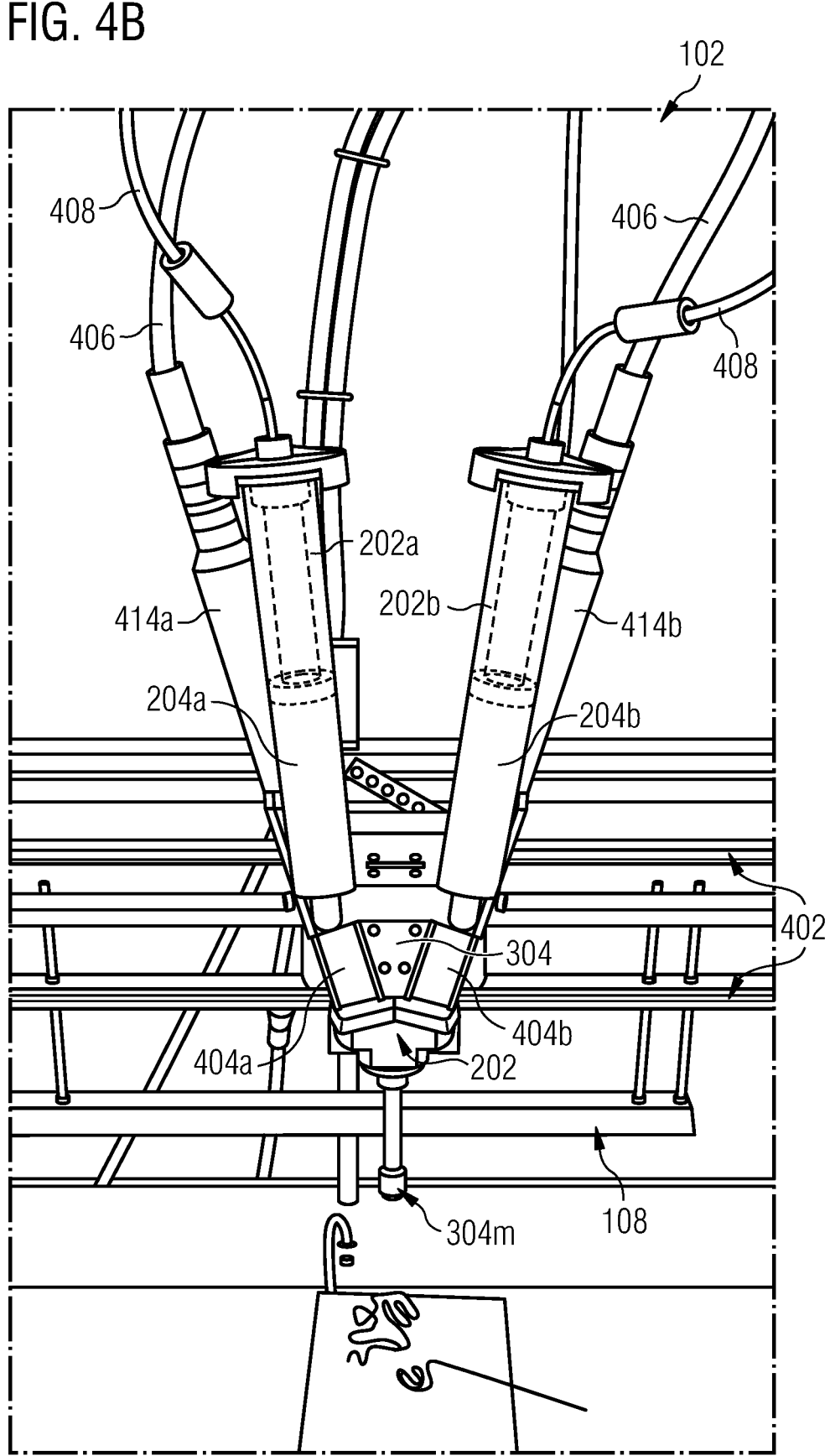
Figure 4C:
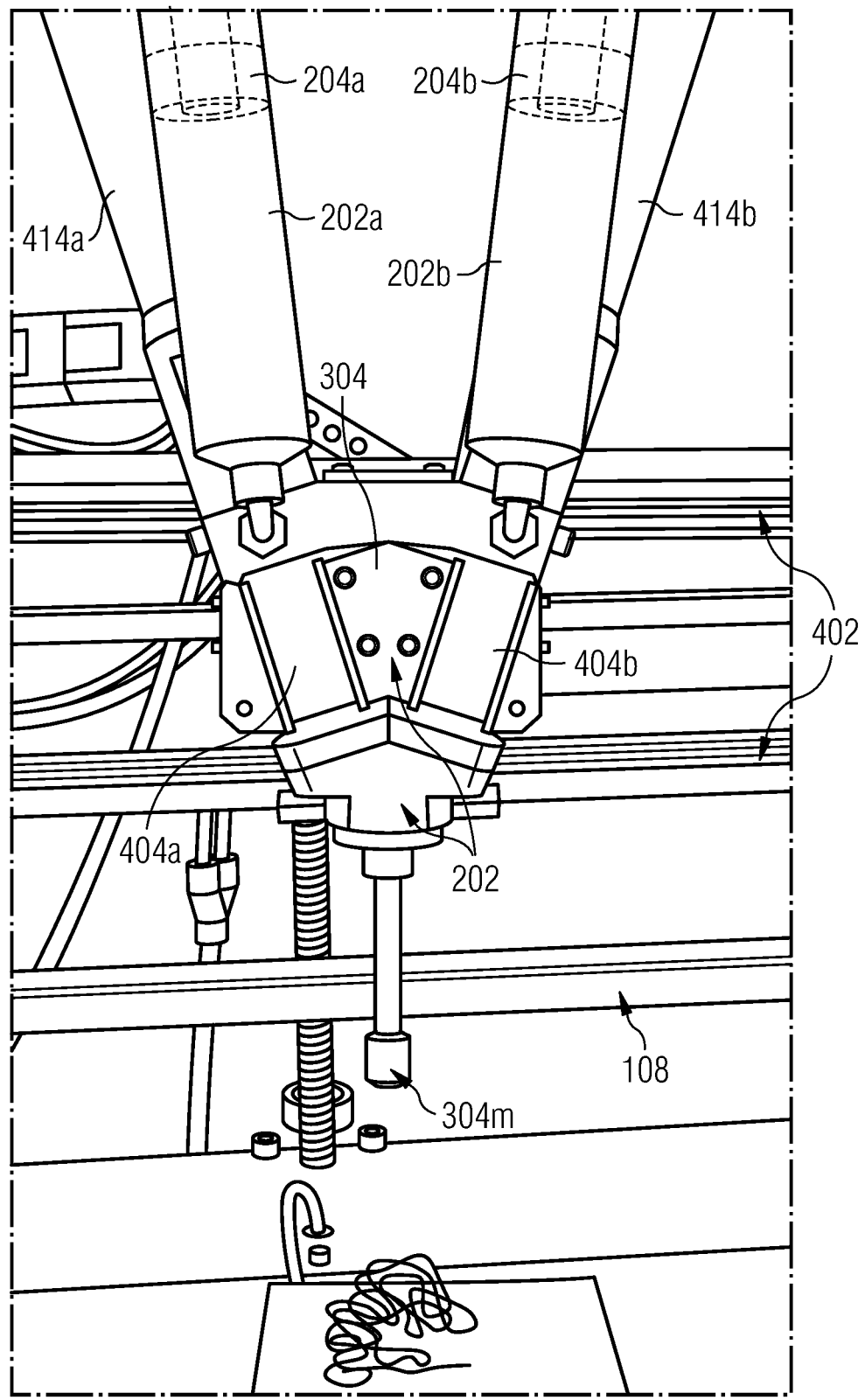

As illustrated for example in FIG. 4B and FIG. 4C, a printing head 102 may be movably mounted at the guiding structure 402. Illustratively, the guiding structure 402 may provide a support frame to carry the printing head 102 and the rod-shaped heating device 108.

According to various embodiments, the two printing material components 204a, 204b may be fed from the respective containers 202a, 202b, e.g., unmixed, to the dispenser 304. The dispenser 304 may include two separately controllable pumps 404a, 404b. For example, a separately controllable pump 404a, 404b may be used for conveying each of the two printing material components 204a, 204b. The pumps 404a, 404b may be configured to feed at least two printing material components 204a, 204b to a reservoir 202, and subsequently to a mixer 304m (e.g., to a static mixer including screw mixing channels) in a controlled manner. The mixer 304m may be arranged to receive the material output of the pumps 404a, 404b. According to various embodiments, a nozzle 304n, as described above, may be screwed on a portion of the mixer 304m.

According to various embodiments, each of the printing material components 204a, 204b may be provided with a pressure in the range from about 1 bar to 3 bar, e.g., with a pressure of about 2 bar, to the respective pump input of the pumps 404a, 404b. The pressure may be provided by compressed air or by another suitable setup. The pumps 404a, 404b may be configured as screw conveyors including at least one screw element for controlling the material output based on rotational speed and/or number of rotations of the at least one screw element. The pumps 404a, 404b may be configured to feed the printing material components 204a, 204b to the mixer 304m in a predefined mixing ratio. According to various embodiments, the mixing ratio may be adjusted to a predefined value by controlling rotational speed and/or number of rotations of the at least one screw element of the respective pump 404a, 404b. Both pump outputs may be coupled to a reservoir 202 and subsequently to the mixer 304m.

The printing head 102 may include two cartridges 202a, 202b (e.g., two pre-reservoir) connected to the dispenser 304, wherein the printing material components 204a, 204b may be stored in the two cartridges 202a, 202b to feed the printing material components 204a, 204b to the dispenser 304. Alternatively, the printing material components 204a, 204b may be fed directly to the dispenser 304 from any suitable container via one or more supply lines.

According to various embodiments, the compressed air supply (e.g., with a pressure of about 2 bar) may be provided to the cartridges 202a, 202b by pressure lines 408 (e.g., hoses or tubes). According to various embodiments, pump motors 414a, 414b may be coupled to the pumps 404a, 404b respectively. The pump motors 414a, 414b may be supplied with power by one or more electrical supply lines 406. According to various embodiments, movement of the pump motors 414a, 414b may be controlled by the dosage controller 214. The mixing ratio of the printing material components 204a, 204b may be controlled by the rotation-ratio or rpm-ratio of the pump motors 414a, 414b.

According to various embodiments, the pumps 404a, 404b, the pump motors 414a, 414b, and the reservoir 202 may be part of the dispenser.

Figure 4D:
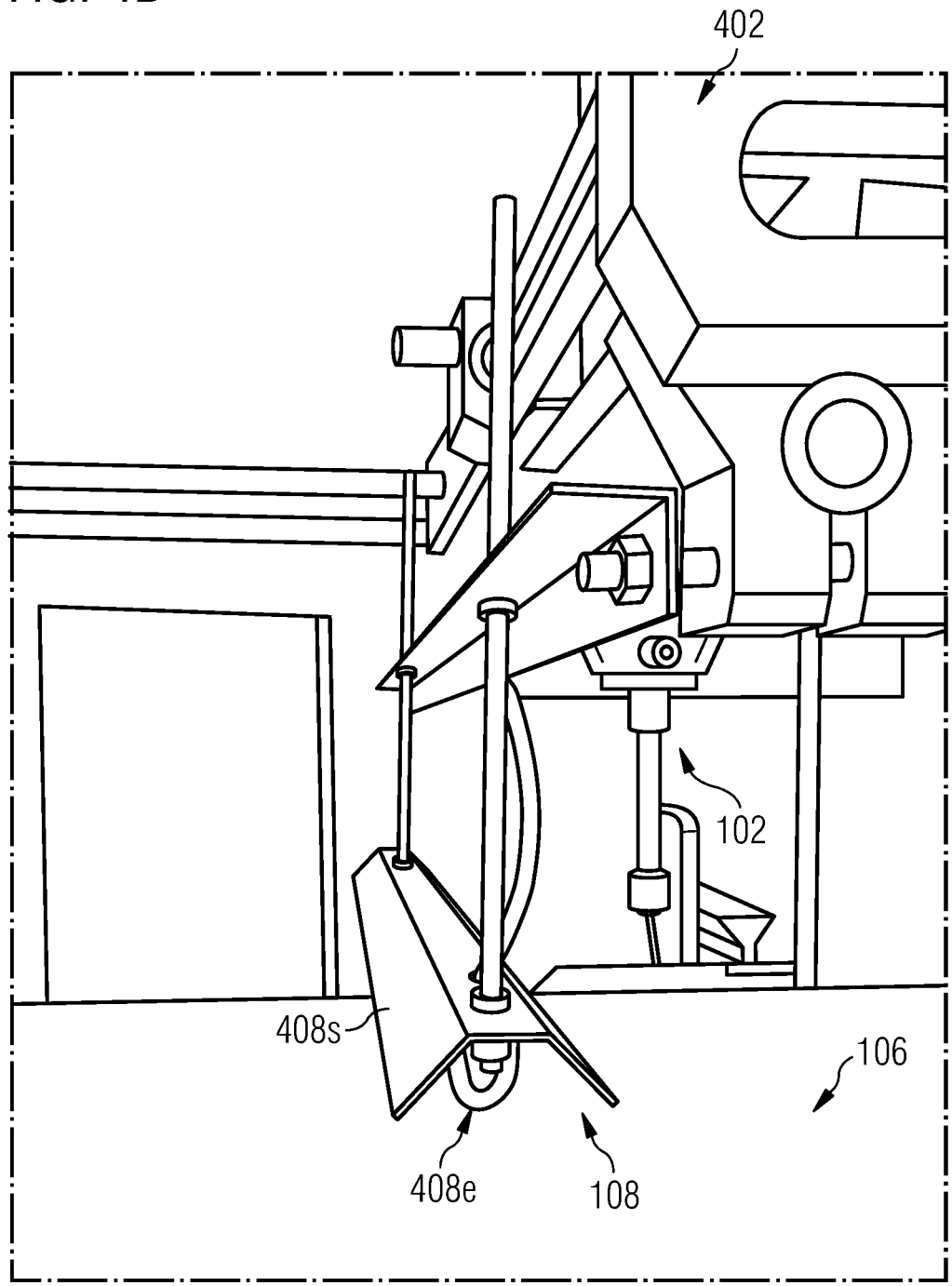
Figure 4E:
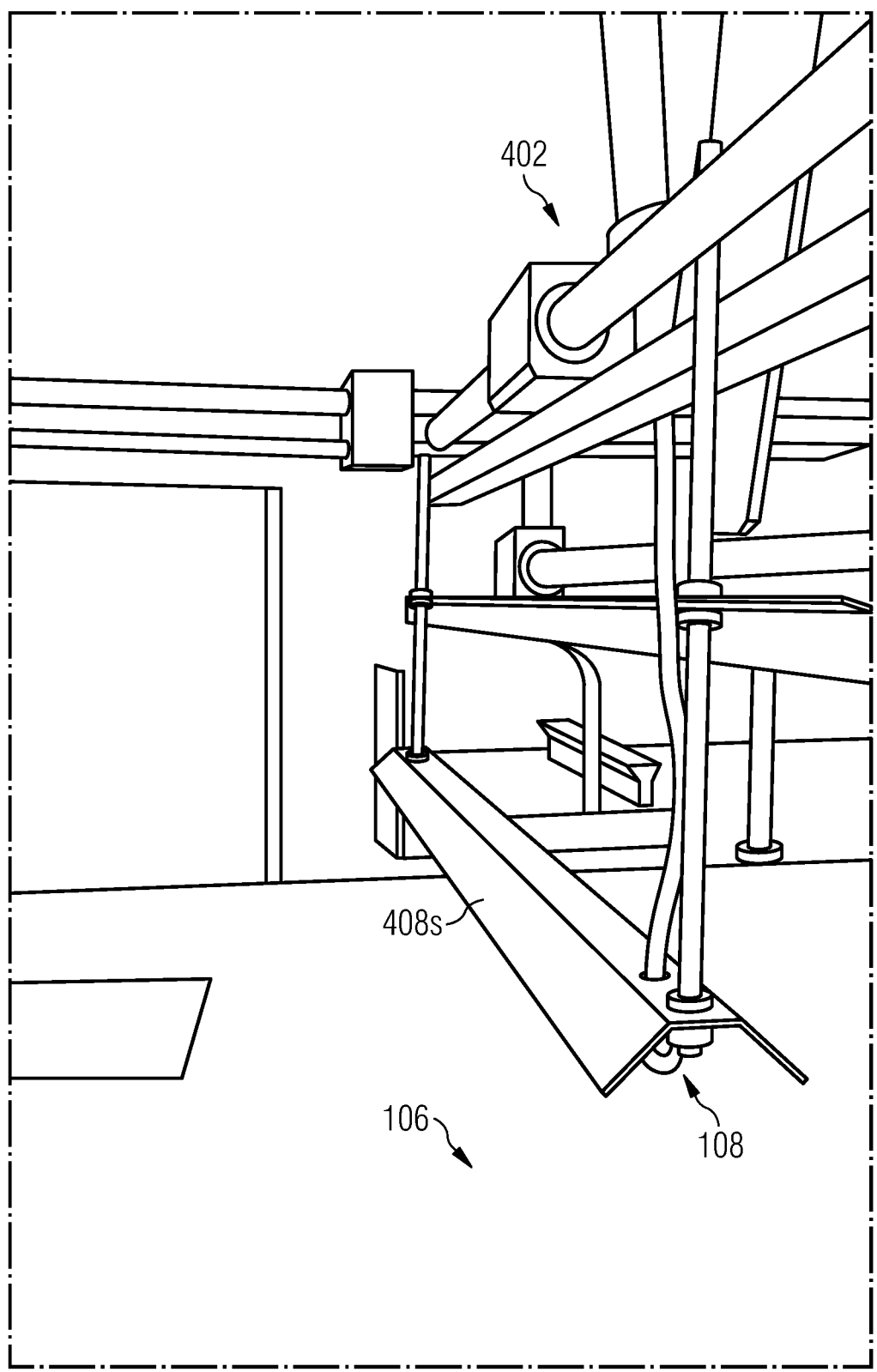

As illustrated for example in FIG. 4D and FIG. 4E, the rod-shaped heating device 108 may be fixed to the guiding structure 402 to emit heat into the direction of the printing platen 106. The rod-shaped heating device 108 may include a heat shield 408s and or a reflector. The heat shield 408s may include or may be made of at least one metal, e.g., aluminum, silver, gold, and the like. An IR-rod 408e may be used to emit IR-radiation.

According to various embodiments, after a layer has been printed, the printing head 102 may be moved to an edge of the guiding structure 402 into a waiting position. Afterwards, the rod-shaped heating device 108 may be activated and driven over the printing platen 106 (e.g., along the y-direction). The rod-shaped heating device 108 may be driven once forwards and backwards over the printing platen 106 for each of the printed layers. Afterwards, the rod-shaped heating device 108 may be deactivated, and the printing head 102 may be moved from the waiting position back into an operating position.

Figure 4F:
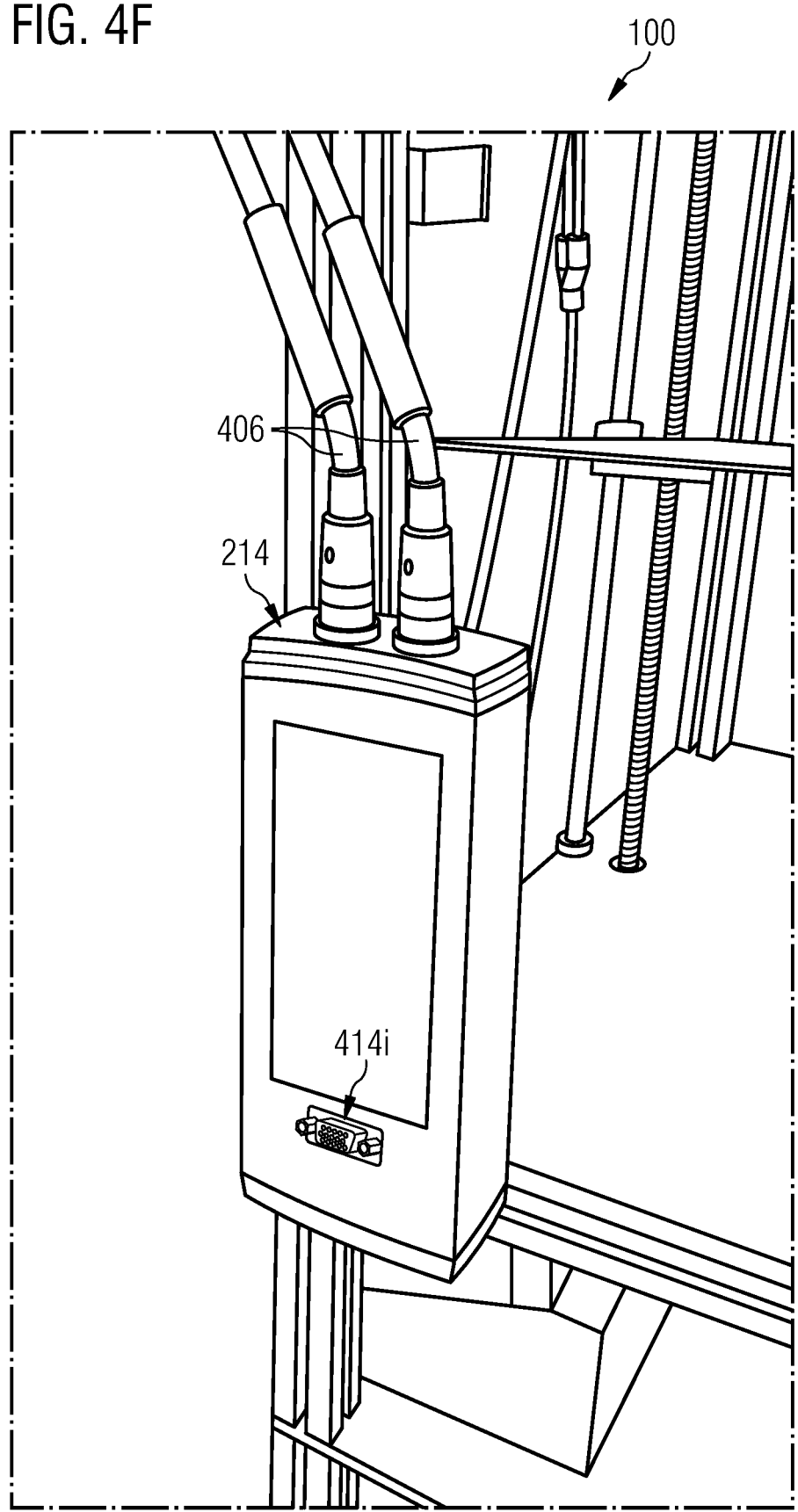

According to various embodiments, the material flow (i.e. the volume output) of the printing material 104 through the nozzle (i.e. the material output) and the mixing ratio of the printing material 104 may be controlled by the dosage controller 214, exemplarily shown in FIG. 4F.

The volume output may be determined based on printing head movement parameters (e.g., Step/Gear/Direction) generating the desired layer of the three-dimensional object. The volume output may be determined as a material flow, i.e. volume output per time. Therefore, the dosage controller 214 may determine the motor-rotations or motor-rotations per time (rounds per minute, rpm, or rounds per second, rps) to provide the desired material flow and therefore the desired volume output.

The motor-rotations or motor-rotations per time may be divided across the pump motors 414a, 414b in accordance with a pre-defined ratio, the pre-defined ratio representing the mixing ratio for the printing material components 204a, 204b conveyed by the pumps 404a, 404b rotated by the pump motors 414a, 414b.

For example, eight rotations may be divided across the pump motors 414a, 414b into four rotations for each of the pump motors 414a, 414b if the pre-defined ratio is 1:1. According to various embodiments, the mixing ratio and therefore the pre-defined ratio for driving the pump motors 414a, 414b may be fixed or variable during operation of the printing device 100. The dosage controller 214 may include an interface 414i for selecting and/or changing the pre-defined ratio.

According to various embodiments, the rod-shaped heating device 108 may include one or more glass tubes, e.g., made of high quality quartz glass. The rod-shaped heating device 108 may be configured as a twin tube radiator. According to various embodiments, each glass tube may provide a housing for at least one heating coil. The respective heating coil may be driven by an electrical current flow through the heating coil. The electrical current flow may be used to control the temperature of the heating coil and therefore the electromagnetic wave spectrum of the radiation emitted by the heating coil. According to various embodiments, the heating coil may be heated up to about 2000° C., e.g., to a temperature greater than about 1500° C., to substantially emit short-wave IR-radiation. According to various embodiments, a reflector (e.g., a metal layer, as for example a silver or gold layer) may be disposed within the glass tube or outside the glass tube. The ramp time for heating the heating coil up and cooling the heating coil down may be less than two seconds, e.g., in the range from about 1 s to about 2 s.

Various examples are provided in the following that are embodied as described with reference to the figures or similar to the embodiments described above.

Example 1 is a device for mold-free (in other words form-free) printing (also referred to das additive manufacturing or 3D-printing) a three-dimensional object in (e.g., successively formed) layers using at least one printing material, wherein the device may include: a printing platen; at least one printing head configured to output (in other words, to print, e.g. to extrude or to string-shaped extrude) the at least one printing material and to form at least one printing material deposit on the printing platen (via the at least one printing material output by the at least one printing head); and a rod-shaped heating device arranged over the printing platen in a moveable configuration allowing movement of the rod-shaped heating device over the printing platen, wherein the rod-shaped heating device is configured to emit heat radiation directed at the printing platen to harden (in other words, to cure, activate, or trigger) the at least one printing material deposit via the heat radiation.

In Example 2, the device of Example 1 may optionally include that the at least one printing head is configured to output the at least one printing material in a string-shape.

In Example 3, the device of Example 1 or 2 may optionally further include a motor arrangement configured to drive movement of the rod-shaped heating device.

In Example 4, the device of Example 3 may optionally include that the motor arrangement includes at least one motor coupled to the rod-shaped heating device and at least one motor controller configured to control the driven movement of the rod-shaped heating device via the at least one motor.

In Example 5, the device of any one of Examples 1 to 4 may optionally further include a heating device controller configured to control emission of the heat radiation from the rod-shaped heating device.

Example 6 is a device for mold-free (in other words form-free) printing (also referred to das additive manufacturing or 3D-printing) a three-dimensional object in (e.g., successively formed) layers using at least one printing material, wherein the device may include: a printing platen; at least one printing head configured to output (in other words, to print, e.g. to extrude or to string-shaped extrude) the at least one printing material and to form at least one printing material deposit on the printing platen (via the at least one printing material output by the at least one printing head); and a rod-shaped radiation emitting device arranged over the printing platen in a moveable configuration allowing movement of the rod-shaped radiation emitting device over the printing platen, wherein the rod-shaped radiation emitting device is configured to emit radiation directed at the printing platen to harden (in other words to cure, activate, or trigger) the at least one printing material deposit via the radiation.

Example 7 is a device for mold-free (in other words form-free) printing (also referred to das additive manufacturing or 3D-printing) a three-dimensional object in (e.g., successively formed) layers using at least one reactive printing material, wherein the device may include: a printing platen; at least one printing head configured to output (in other words, to print, e.g. to extrude or to string-shaped extrude) the at least one reactive printing material and to form at least one reactive printing material deposit on the printing platen (via the at least one printing material output by the at least one printing head); and a rod-shaped radiation emitting device arranged over the printing platen in a moveable configuration allowing movement of the rod-shaped radiation emitting device over the printing platen, wherein the rod-shaped radiation emitting device is configured to emit radiation directed at the printing platen to activate a chemical reaction in the at least one reactive printing material deposit via the radiation.

In Example 8, the device of Example 6 or 7 may optionally include that the at least one printing head is configured to output the at least one printing material in a string-shape.

In Example 9, the device of any one of Examples 6 to 8 may optionally further include a motor arrangement configured to drive movement of the rod-shaped radiation emitting device.

In Example 10, the device of Example 9 may optionally include that the motor arrangement includes at least one motor coupled to the rod-shaped radiation emitting device and at least one motor controller configured to control the driven movement of the rod-shaped radiation emitting device via the at least one motor.

In Example 11, the device of any one of Examples 6 to 10 may optionally further include a radiation emitting device controller configured to control emission of the radiation from the rod-shaped radiation emitting device.

According to various embodiments, a device for mold-free printing a three-dimensional object in layers using at least one printing material may include: a printing platen; at least one printing head configured to output the at least one printing material in a string-shape and to form at least one printing material deposit on the printing platen (via the at least one printing material output by the at least one printing head); and a rod-shaped heating device arranged over the printing platen in a moveable configuration allowing movement of the rod-shaped heating device over the printing platen, wherein the rod-shaped heating device is configured to emit heat radiation directed at the printing platen to harden the at least one printing material deposit via the heat radiation.

According to various embodiments, a device for mold-free printing a three-dimensional object in layers using at least one printing material may include: a printing platen; at least one printing head configured to output the at least one printing material in a string-shape and to form a deposit layer on the printing platen via the at least one printing material output by the at least one printing head; and a rod-shaped heating device arranged over the printing platen in a moveable configuration allowing movement of the rod-shaped heating device over the printing platen, wherein the rod-shaped heating device is configured to emit heat radiation directed at the printing platen to harden the deposit layer via the heat radiation.

According to various embodiments, the rod-shaped heating device comprises a rod-shaped lamp. According to various embodiments, the rod-shaped lamp may be a rod-shaped infrared emitting lamp. According to various embodiments, the rod-shaped lamp may be configured to emit light having a wavelength in the range from about 780 nm to about 1 mm. According to various embodiments, the rod-shaped lamp may be configured to emit light having a wavelength in the range from about 780 nm to about 12 µm, e.g., in the range from about 780 nm to about 5 µm, e.g., in the range from about 780 nm to about 2.5 µm, e.g., in the range from about 900 nm to about 2.5 µm. According to various embodiments, the rod-shaped lamp may have a length of approximately the same or greater than the width of the printing platen. In this case, the emitted heat radiation may be irradiated on substantially the entire width of the printing platen. According to various embodiments, the rod-shaped heating device may be linearly movably arranged over the printing platen.

According to various embodiments, moving a rod-shaped heating device or a rod-shaped radiation emitting device, e.g., linearly, over the printing platen may allow homogenously irradiating the printing material deposit layer formed on the printing platen. A spot-wise irradiation or an irradiation of the entire surface of the printing platen at once may be less homogeneous as moving the rod-shaped heating device or the rod-shaped radiation emitting device over the printing platen, as described herein. According to various embodiments, the movement speed for moving the rod-shaped heating device or the rod-shaped radiation emitting device over the printing platen may be fixed to a pre-defined value to obtain a homogeneous irradiation. According to various embodiments, the movement direction for moving the rod-shaped heating device or the rod-shaped radiation emitting device over the printing platen may be switched once from forwards to backwards (e.g., from a first direction to a second direction anti-parallel to the first direction) for each of the layers of printing material deposit successively formed.

In Example 12, the device of any one of Examples 1 to 11 may optionally further include a reservoir to receive the at least one printing material. The reservoir may be coupled to the at least one printing head to supply the at least one printing material to the at least one printing head.

In Example 13, the device of any one of Examples 1 to 11 may optionally further include: a first pre-reservoir to receive a first pre-printing liquid; and a second pre-reservoir to receive a second pre-printing liquid; and a reservoir to receive the first pre-printing liquid and the second pre-printing liquid and to provide the at least one printing material from the first pre-printing liquid and the second pre-printing liquid. According to various embodiments, the first pre-printing liquid and the second pre-printing liquid may be components of a two-component reactive printing material.

In Example 14, the device of Example 13 may optionally further include: a dosage controller configured to dose the at least one printing material supplied to the reservoir. According to various embodiments, the dosage controller may be configured to dose the amount of first pre-printing liquid and the amount of second pre-printing liquid supplied to the reservoir.

According to various embodiments, the motor controller may be further configured to control the at least one motor to move the rod-shaped heating device or rod-shaped radiation emitting device over the printing platen at least once each time after a respective layer of the at least one printing material deposit has been formed. According to various embodiments, the motor controller may be further configured to control the at least one motor to move the rod-shaped heating device or rod-shaped radiation emitting device over the printing platen two times each time after a respective layer of the at least one printing material deposit has been formed.

According to various embodiments, the heating device controller (also referred to as heat controller) may be further configured to control the rod-shaped heating device to emit a heat radiation directed to the printing platen to heat the printing material deposit to a reaction temperature of the at least one printing material of the at least one printing material deposit. According to various embodiments, the radiation emitting device controller may be further configured to control the rod-shaped radiation emitting device to emit a radiation directed to the printing platen to trigger a chemical reaction in the printing material deposit.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A device for formfree printing a three-dimensional object in layers using at least one printing material, the device comprising:
at least one printing head to output printing material in at least one printing material string in string-shape;
a printing platen to receive the at least one printing material string output by the at least one printing head;
a rod-shaped heating device movably arranged over the printing platen and parallel to a surface of the printing platen, wherein the rod-shaped heating device comprises a rod-shaped lamp, and wherein the rod-shaped lamp has a length of the same or higher than the width of the printing platen so that the irradiated heat is irradiated on substantially the entire width of the printing platen;
a heat controller configured to control the rod-shaped heating device to emit a heat irradiation directed to the printing platen to heat the at least one printing material string to a reaction temperature to trigger a chemical reaction of the at least one printing material of the at least one printing material string;
wherein the rod-shaped heating device, the heat controller, and the printing platen are configured such that substantially the entire width of the surface of the printing platen is irradiated homogeneously;
at least one motor coupled to the rod-shaped heating device to move it over the printing platen;
a motor controller configured to control the at least one motor to move the rod-shaped heating device over the printing platen to harden the at least one printing material string printed on the printing platen.

2. The device of claim 1, wherein the rod-shaped lamp is configured to emit light having a wavelength in the range from about 780 nm to about 12 μm.

3. The device of claim 2, wherein the rod-shaped lamp is a rod-shaped infrared lamp.

4. The device of claim 1, further comprising a reservoir to receive the at least one printing material, wherein the reservoir is coupled to the at least one printing head to supply the at least one printing material to the at least one printing head.

5. The device of claim 1, further comprising:
a first pre-reservoir to receive a first pre-printing liquid;
a second pre-reservoir to receive a second pre-printing liquid; and
a reservoir to receive the first pre-printing liquid and the second pre-printing liquid and to provide the at least one printing material from the first pre-printing liquid and the second pre-printing liquid.

6. The device of claim 1, wherein the rod-shaped heating device is linearly movably arranged over the printing platen.

7. The device of claim 4, further comprising a dosage controller configured to dose the at least one printing material supplied to the reservoir.

8. The device of claim 5, further comprising a dosage controller configured to dose the amount of first pre-printing liquid and the amount of second pre-printing liquid supplied to the reservoir.

9. The device of claim 1, wherein the motor controller is further configured to control the at least one motor to move the rod-shaped heating device over the printing platen at least once each time after a respective layer of the at least one printing material string has been printed on the printing platen.

10. The device of claim 1, wherein the rod-shaped lamp comprises a heating region and is configured to homogenously emit heat along the heating region, wherein the heating region has a length of the same or higher than the width of the printing platen so that the heat is irradiated on substantially the entire width of the printing platen.

11. The device of claim 1, wherein the motor controller is configured to control the at least one motor to linearly move the rod-shaped heating device over the printing platen only along a length direction of the printing platen to irradiate the entire surface of the printing platen.

* * * * *